US007743579B2

(12) United States Patent
Chaney

(10) Patent No.: US 7,743,579 B2
(45) Date of Patent: Jun. 29, 2010

(54) CONNECTION PLATE FOR USE IN CONSTRUCTING A METAL BUILDING

(75) Inventor: Tom Chaney, Lakeland, TN (US)

(73) Assignee: BlueScope Buildings North America, Inc., Kansas City, MO (US)

( * ) Notice: Subject to any disclaimer, the term of this patent is extended or adjusted under 35 U.S.C. 154(b) by 0 days.

(21) Appl. No.: 12/059,615

(22) Filed: Mar. 31, 2008

(65) Prior Publication Data

US 2008/0307743 A1 Dec. 18, 2008

Related U.S. Application Data

(60) Provisional application No. 60/909,268, filed on Mar. 30, 2007.

(51) Int. Cl.
| | |
|---|---|
| *E04C 2/38* | (2006.01) |
| *E04C 3/02* | (2006.01) |
| *E04B 1/38* | (2006.01) |
| *E04B 1/00* | (2006.01) |
| *E04B 1/18* | (2006.01) |
| *E04H 12/20* | (2006.01) |
| *F16B 7/00* | (2006.01) |
| *F16B 7/10* | (2006.01) |
| *F16B 1/00* | (2006.01) |
| *E06B 3/984* | (2006.01) |

(52) U.S. Cl. .................. 52/656.9; 52/699; 52/712; 52/636; 52/700; 52/657; 52/696; 403/292; 403/64; 403/205; 403/401

(58) Field of Classification Search ............... 403/293, 403/294, 295, 54, 64, 170–174, 205, 217, 403/401; 52/261, 271, 272, 275, 699, 700, 52/712–715, 745, 150, 152, 153, 154, 656.9, 52/657, 695, 696, 90.1, 94, 262, 633, 636, 52/698

See application file for complete search history.

(56) References Cited

U.S. PATENT DOCUMENTS 209,024 A 10/1878 Covert (Continued)

FOREIGN PATENT DOCUMENTS

WO WO 96/35022 11/1996

OTHER PUBLICATIONS

International Search Report and Written Opinion in related PCT/US2008/058901 dated Aug. 8, 2008.

*Primary Examiner*—Brian E Glessner
*Assistant Examiner*—Omar Hijaz
(74) *Attorney, Agent, or Firm*—Lathrop & Gage LLP

(57) ABSTRACT

Connection plates for constructing buildings are disclosed herein. In one embodiment, a connection plate includes a generally planar insert member and a support member. Insert member has a first side configured for receipt in a slot defined by a structural member and a second side configured for receipt in a slot defined by another structural member. First and second sides collectively define inner and outer edges. Support member is coupled to first and second sides is generally perpendicular to insert member in two directions. Either (1) a portion of inner edge corresponding to first side is angled relative to a portion of inner edge corresponding to second side and support member is coupled to inner edge; or (2) a portion of outer edge corresponding to first side is angled relative to a portion of outer edge corresponding to second side and support member is coupled to outer edge.

18 Claims, 9 Drawing Sheets

U.S. PATENT DOCUMENTS

| | | | | |
|---|---|---|---|---|
| 215,298 | A * | 5/1879 | Rix | 403/293 |
| 452,274 | A * | 5/1891 | Keller | 14/13 |
| 649,352 | A | 5/1900 | Rector | |
| 1,369,837 | A * | 3/1921 | Price | 403/402 |
| 2,653,553 | A | 9/1953 | Jacobs | |
| 2,688,167 | A | 9/1954 | Wilson | |
| 2,713,924 | A | 7/1955 | Tripp | |
| 3,123,185 | A * | 3/1964 | Van Der Rijst | 52/633 |
| 3,157,251 | A | 11/1964 | Rasch | |
| 3,305,252 | A * | 2/1967 | Jureit | 403/170 |
| 3,309,120 | A | 3/1967 | Wada | |
| 3,425,720 | A | 2/1969 | Spane | |
| 4,342,177 | A | 8/1982 | Smith | |
| 4,411,547 | A | 10/1983 | Johnson | |
| 4,489,529 | A * | 12/1984 | Ollinger et al. | 52/506.07 |
| 4,773,192 | A | 9/1988 | Andrews | |
| 4,809,480 | A * | 3/1989 | Hale | 52/702 |
| 4,995,214 | A | 2/1991 | Wolf | |
| 5,660,005 | A * | 8/1997 | Tacoma | 52/93.2 |
| 5,927,893 | A | 7/1999 | Imamura et al. | |
| 6,018,923 | A * | 2/2000 | Wendt | 52/712 |
| 6,427,393 | B1 | 8/2002 | Chen et al. | |
| 6,481,177 | B1 | 11/2002 | Wood | |
| 6,625,944 | B2 * | 9/2003 | Mackay | 52/261 |
| 6,810,628 | B2 * | 11/2004 | Emms | 52/92.2 |

* cited by examiner

CONNECTION PLATE FOR USE IN CONSTRUCTING A METAL BUILDING

RELATED APPLICATIONS

The present application claims benefit of priority to provisional U.S. Patent Application No. 60/909,268, filed Mar. 30, 2007 and titled "Connection Plate For Use In Constructing A Metal Building," which is incorporated herein by reference.

BACKGROUND

Brackets and plates are often used in the construction industry to couple one member to another member. Brackets and plates may perform an aligning function to ensure the coupled members are appropriately positioned, and may further resist horizontal pivoting between the coupled members.

One prior art plate 100 used in the construction of metal buildings is shown in FIG. 1. As shown in FIG. 2, the prior art plate 100 may be used to couple a structural member 200 (e.g., a column) and a structural member 202 (e.g., a rafter). When placed in slots 201, 203 defined by the structural members 200, 200, the prior art plate 100 has proven to be effective in aligning the structural member 200 and the structural member 202, which may greatly reduce the amount of time required to erect a building. In addition, the prior art plate 100 may provide some resistance against the structural member 202 moving in directions 205a, 205b relative to the structural member 200. Nevertheless, the prior art plate 100 may provide little structural support to keep the rafter member 202 from buckling in relation to the column 200 in direction 205, and the prior art plate 100 may provide insufficient resistance against the structural member 202 moving in directions 205a, 206b relative to the structural member 200 unless the prior art plate 100 is unacceptably thick. As the thickness of the prior art plate 100 increases, the weight and cost of the prior art plate 100 increase and the width of the slots 201, 203 must increase.

SUMMARY

A connection plate for use in constructing a metal building according to one embodiment includes a generally planar insert member and a support member. The insert member has a first side configured to be at least partially received in a slot defined by a metal column or a metal rafter and a second side configured to be at least partially received in a slot defined by a metal rafter. The first and second sides collectively define an inner edge and an outer edge. The support member has linear sections angled relative to one another, and the support member linear sections are coupled to the first side and the second side at the inner edge or the outer edge and extend generally perpendicular to the insert member. The support member has first and second ends, and the insert member extends beyond the support member first end and the support member second end.

A connection plate for use in constructing a metal building according to another embodiment includes a generally planar insert member and a support member. The insert member has a first side configured to be at least partially received in a slot defined by a first structural member and a second side configured to be at least partially received in a slot defined by a second structural member. The first and second sides collectively define an inner edge and an outer edge. The support member is coupled to the first side and the second side and extends generally perpendicular to the insert member in two directions so that the planar member is positioned between opposed sides of the support member. Either (1) a portion of the inner edge that corresponds to the first side is angled relative to a portion of the inner edge that corresponds to the second side and the support member is coupled to the inner edge; or (2) a portion of the outer edge that corresponds to the first side is angled relative to a portion of the outer edge that corresponds to the second side and the support member is coupled to the outer edge.

A portion of a metal building according to one embodiment includes a first structural member having a slot, a second structural member having a slot, and a connection plate. The connection plate has a generally planar insert member and a support member. The insert member has first and second sides that collectively define an inner edge and an outer edge. The support member includes linear sections angled relative to one another. The support member linear sections are coupled to the insert member first side and the insert member second side at the inner edge or the outer edge, and the support member extends generally perpendicular to the insert member. The support member has first and second ends, and the insert member extends beyond the support member first and second ends. The insert member first side is at least partially in the first structural member slot and coupled to the first structural member; the insert member second side is at least partially in the second structural member slot and coupled to the second structural member.

A method of decreasing thickness of a generally planar connection plate to be used between two structural members of a metal building without reducing the structural integrity of the connection plate includes the steps of decreasing thickness of the connection plate and coupling a support member to the connection plate. The connection plate has first and second sides that collectively define an inner edge and an outer edge, and the support member has linear sections angled relative to one another. The support member linear sections are coupled to the connection plate first side and the connection plate second side at the inner edge or the outer edge. The support member extends generally perpendicular to the connection plate in two directions so that the connection plate is positioned between opposed sides of the support member. The support member has first and second ends, and the insert member extends beyond the support member first end and the support member second end.

BRIEF DESCRIPTION OF THE DRAWINGS

FIG. 4b is an assembled view of FIG. 4a.
FIG. 4c is another assembled view of FIG. 4a.
FIG. 6b is a front view of the connection plate of FIG. 6a.

DETAILED DESCRIPTION

Figure 1:
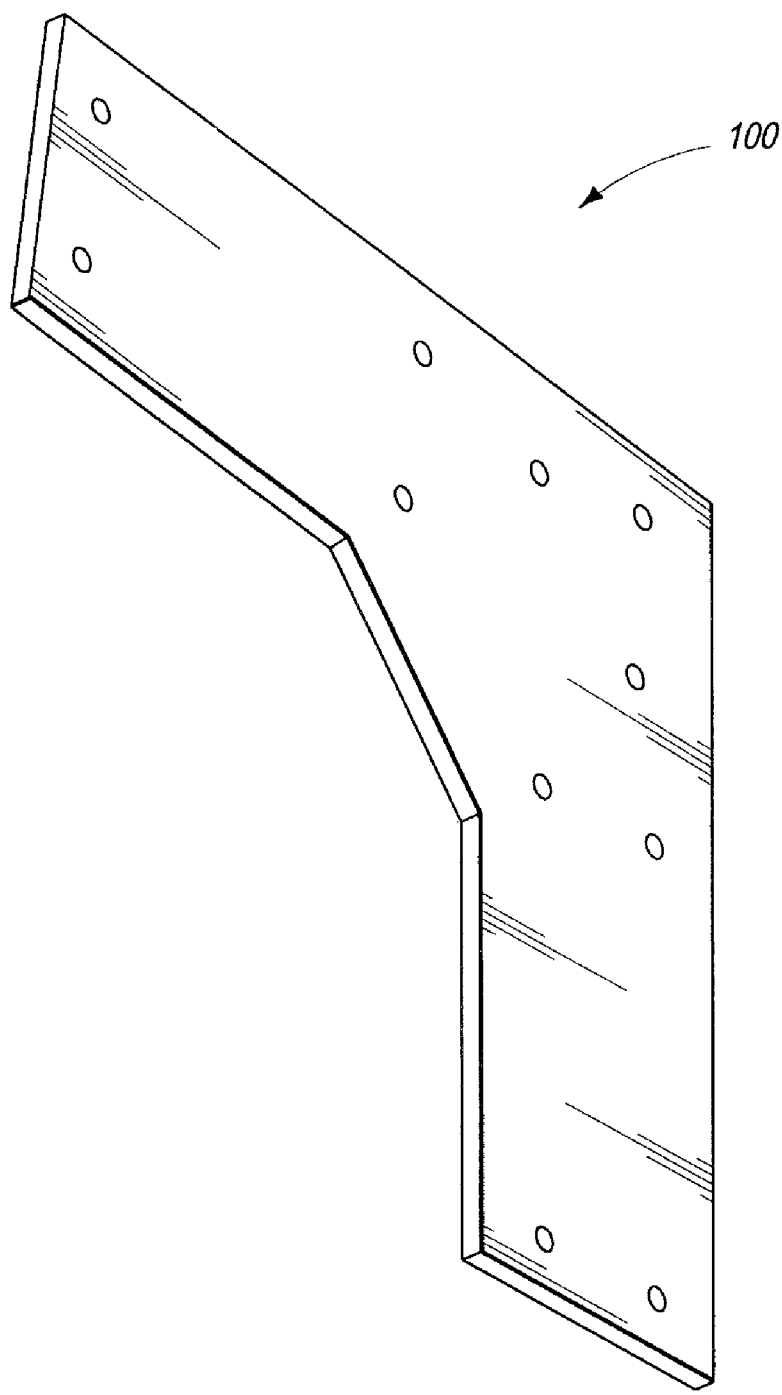
FIG. 1 shows a PRIOR ART plate.
Figure 2:
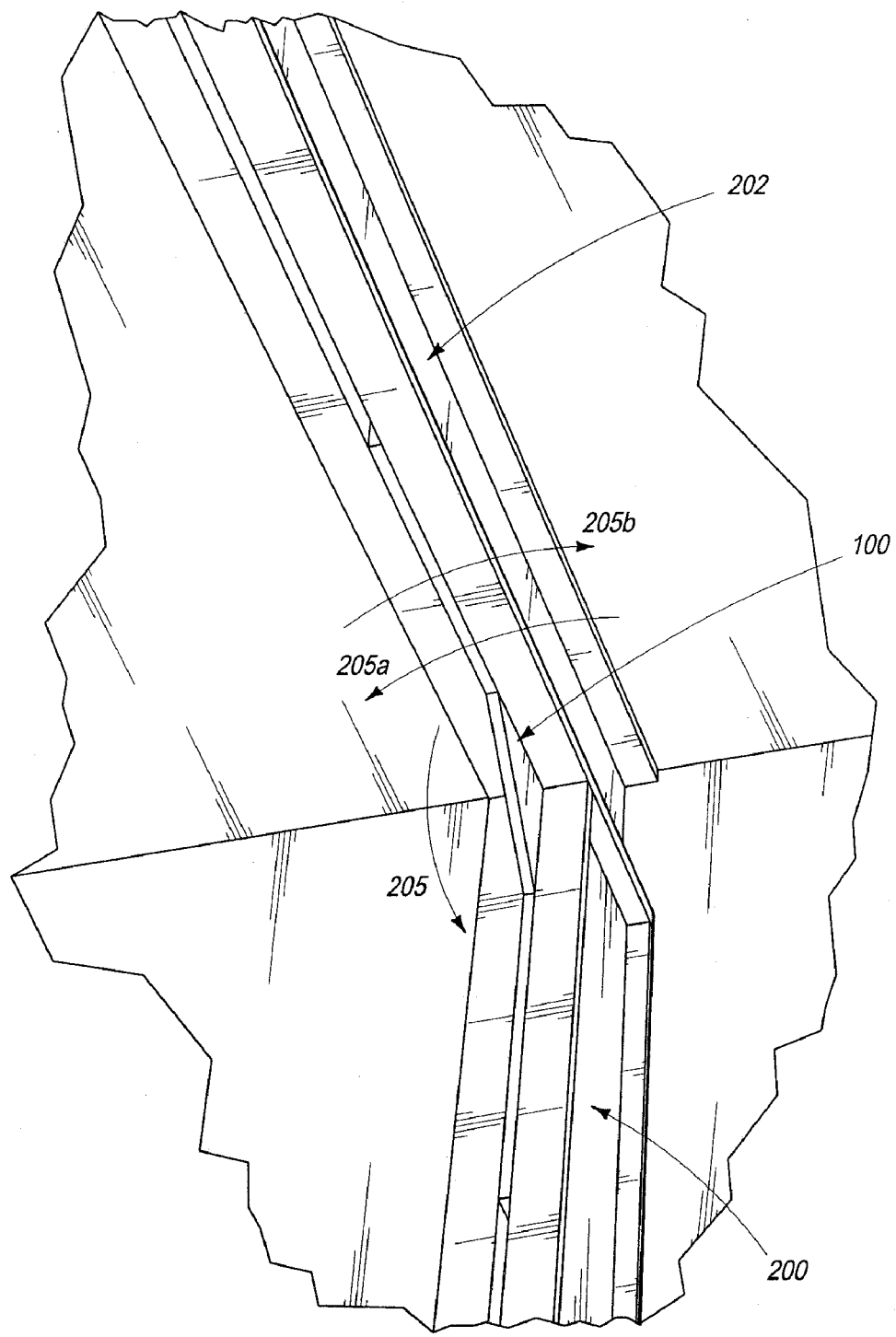
FIG. 2 shows the PRIOR ART plate of FIG. 1 in use.
Figure 3:
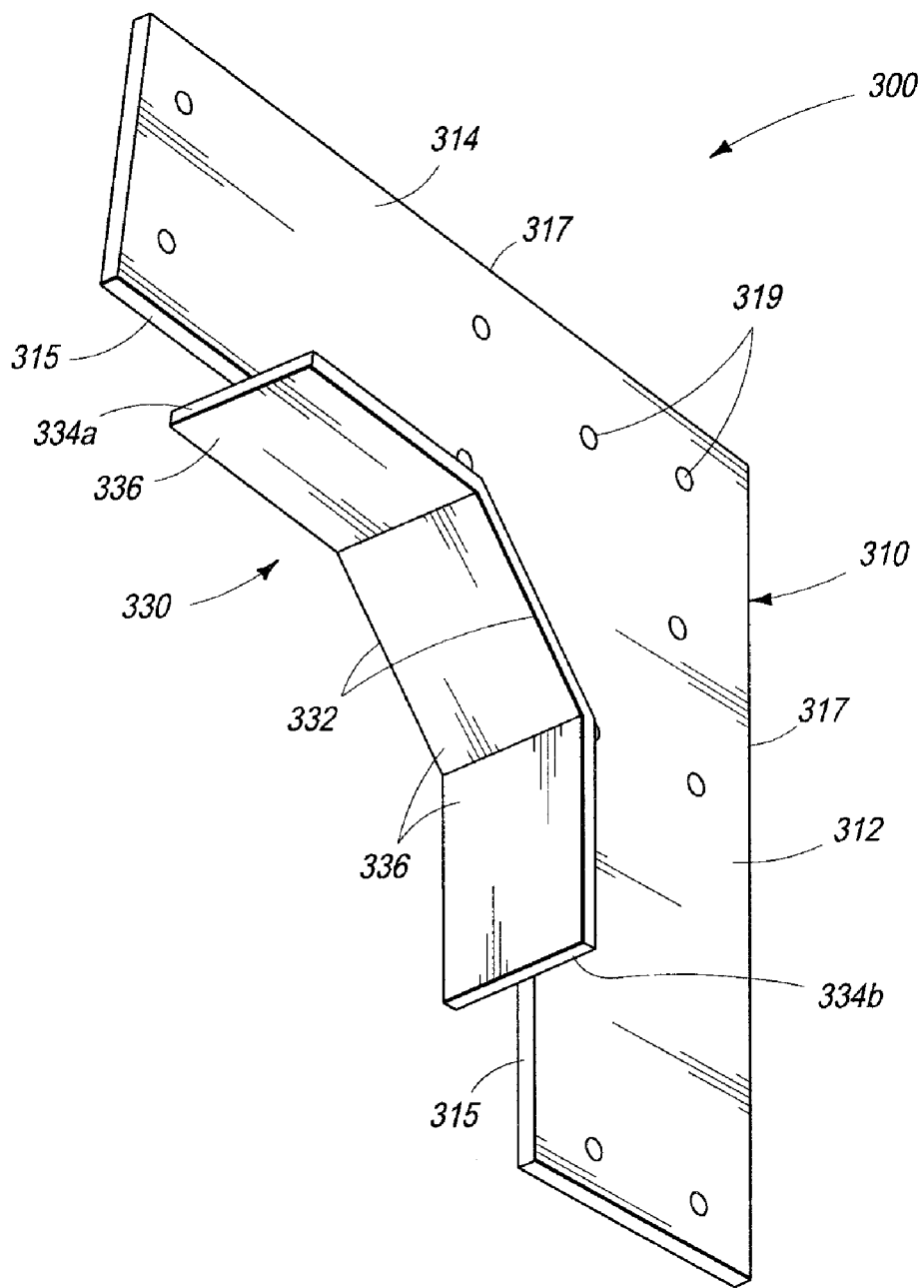
FIG. 3 is a perspective view of a connection plate according to an embodiment.

FIG. 3 shows a connection plate 300 for use in constructing a metal building (e.g., a prefabricated metal building) according to an embodiment. The connection plate 300 includes a generally planar insert member 310 and a support member 330.

Figure 4A:
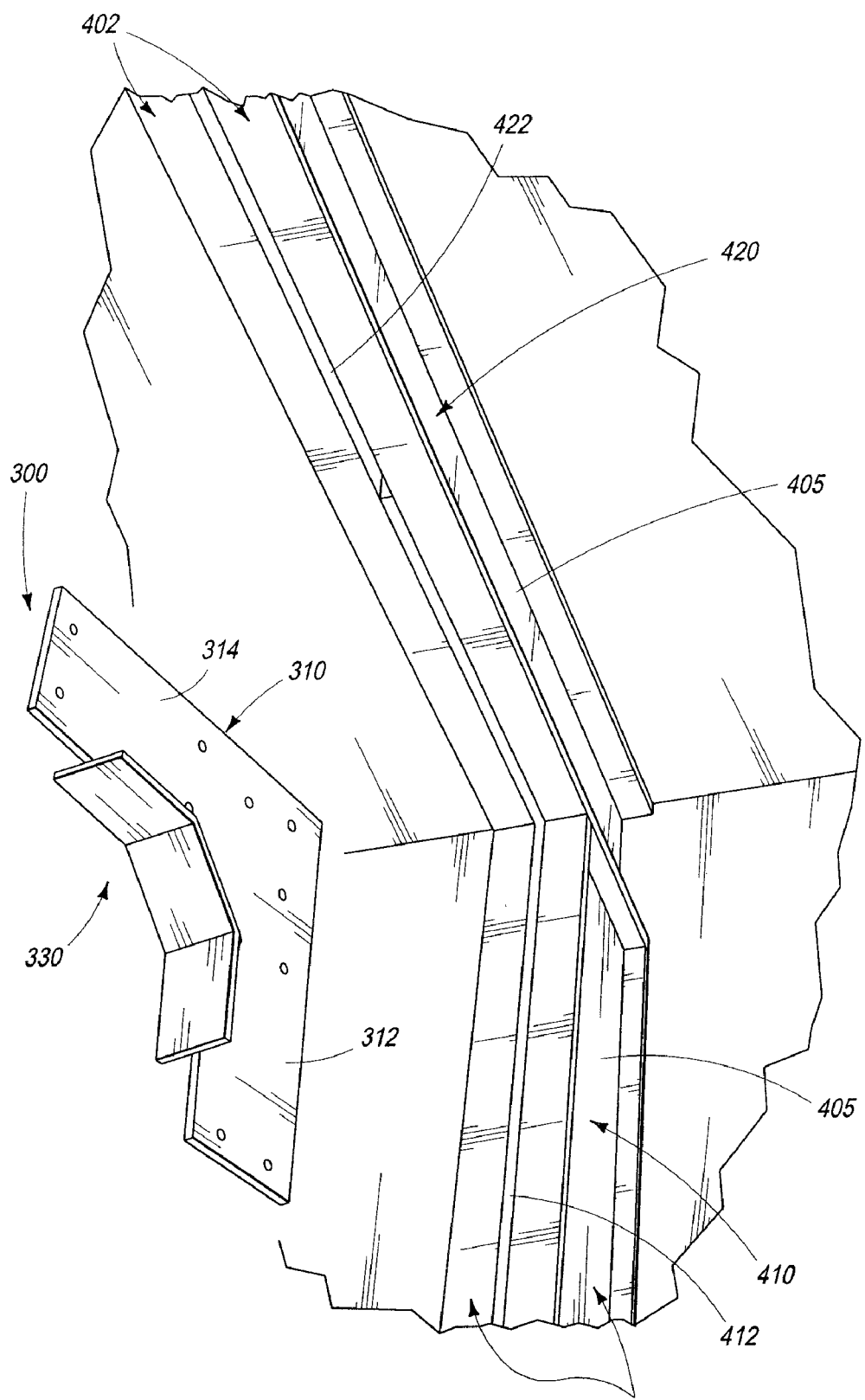
FIG. 4a is an exploded view of the connection plate of FIG. 3 in use.
Figure 4B:
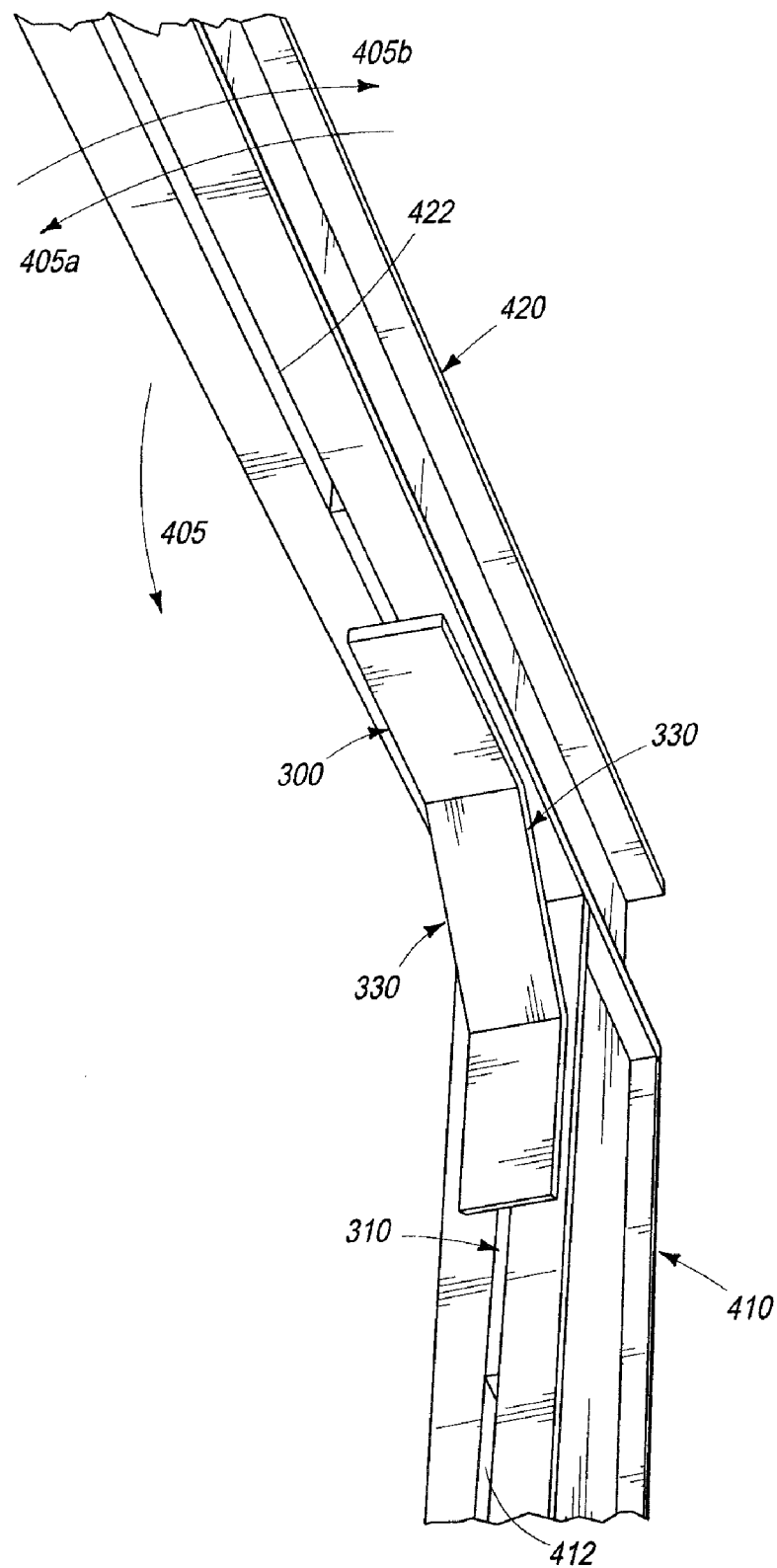

The insert member 310 has a first side 312 configured to be at least partially received in a slot 412 defined by a first structural member 410 and a second side 314 configured to be at least partially received in a slot 422 defined by a second structural member 420 (FIGS. 4a and 4b). The first and second structural members 410, 420 may each be, for example, pairs of "C" shaped members 402 positioned so that generally planar sides 405 are adjacent one another with slots 412, 422 therebetween. The first structural member 410 may be, for example, a column, and may or may not be perpendicular to a ground surface. The second structural member 420 may be, for example, a rafter member, and may or may not be parallel to a ground surface. In at least one embodiment, the second structural member 420 is not parallel to the ground surface. The first and second sides 312, 314 collectively define an inner edge 315 and an outer edge 317. A portion of the inner edge 315 that corresponds to the first side 312 is angled relative to a portion of the inner edge 315 that corresponds to the second side 314. The insert member 310 may define a plurality of holes 319 for use in coupling the first and second structural members 410, 420 to the insert member 310 with bolts or other fasteners. The holes 319 may be particularly useful in erecting prefabricated buildings, though they may also be useful in other applications.

Figure 5:
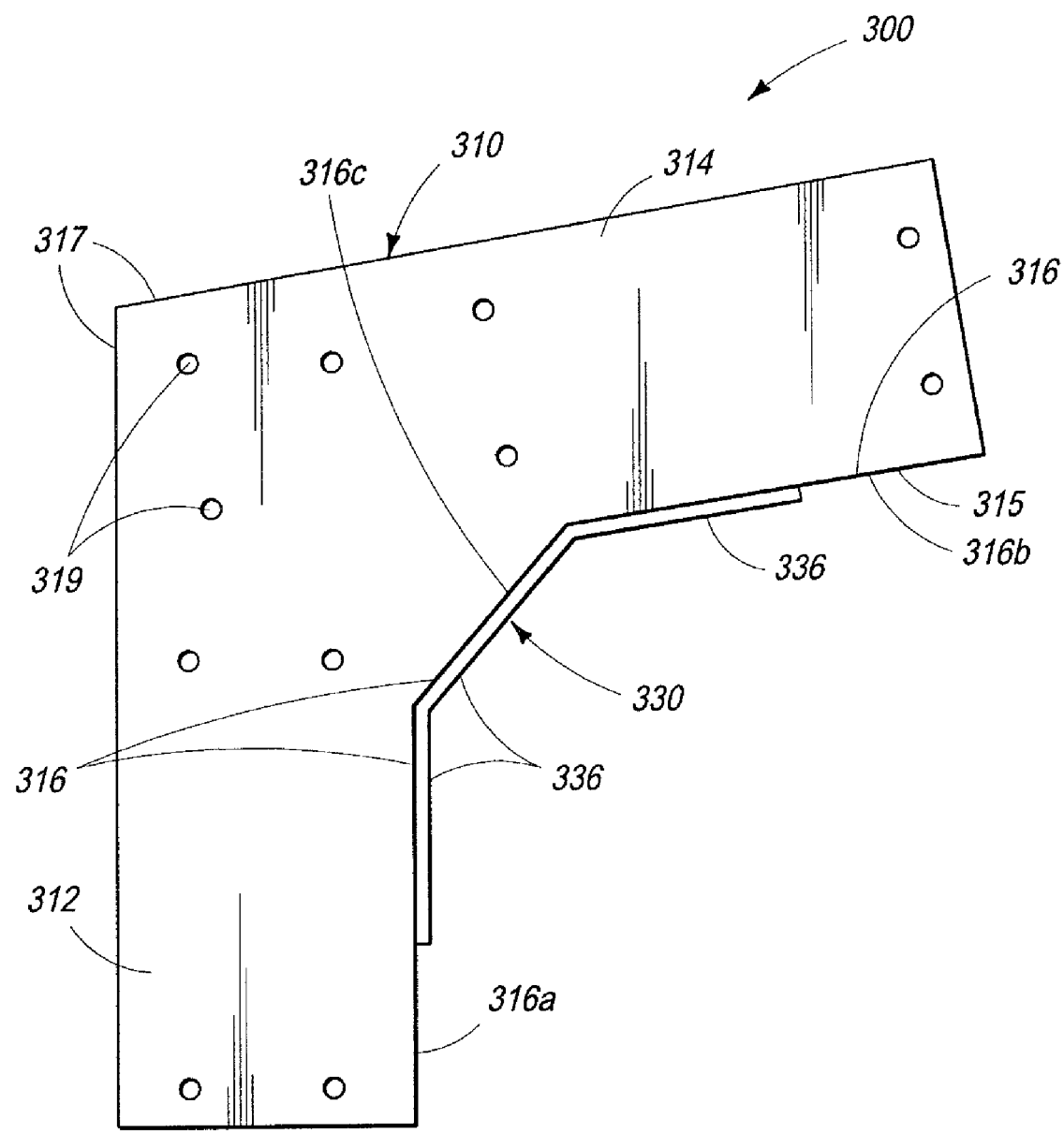
FIG. 5 is a side view of the connection plate of FIG. 3.

As shown in FIG. 5, the inner edge 315 may include a plurality of linear sections 316. A respective linear section 316a may correspond to the first side 312 of the insert member 310, and another linear section 316b may correspond to the second side 314 of the insert member 310. FIG. 5 shows one intermediate linear section 316c located between the linear section 316a that corresponds to the first side 312 and the linear section 316b that corresponds to the second side 314, though more or fewer linear sections 316c may be used. As best shown in FIG. 5, the linear section 316a corresponding to the first side 312 and the linear section 316b corresponding to the second side 314 may be separated by an angle of about ninety degrees to about one hundred and ten degrees in one embodiment for particular use with a column 410 and a rafter 420. For example, the sections 316a, 316b may be separated by an angle of about one hundred degrees. If one or more intermediate linear section 316c is used, the linear sections 316a, 316c, 316b may be sequentially separated by approximately a common angle. In other words, an angle (e.g., approximately one hundred and forty degrees), may be between the linear sections 316a, 316c and between the linear sections 316c, 316b.

The support member 330 may be coupled to the first side 312 of the insert member 310 and the second side 314 of the insert member 310 and extend generally perpendicular to the insert member 310. The support member 330 maybe coupled to the insert member 310 by welding, adhesive, and/or any other appropriate device or method. The support member 330 may extend generally perpendicular to the insert member 310 in two directions so that the insert member 310 is positioned between opposed sides 332 of the support member 330 (FIG. 3). As shown in FIGS. 3 and 5, the support member 330 may be adjacent the inner edge 315, and the support member 330 may extend entirely or only partially therealong. If the support member 330 extends along the inner edge 315, the support member 330 may include a plurality of linear sections 336 that correspond to the linear sections 316 of the inner edge 315.

Figure 4C:
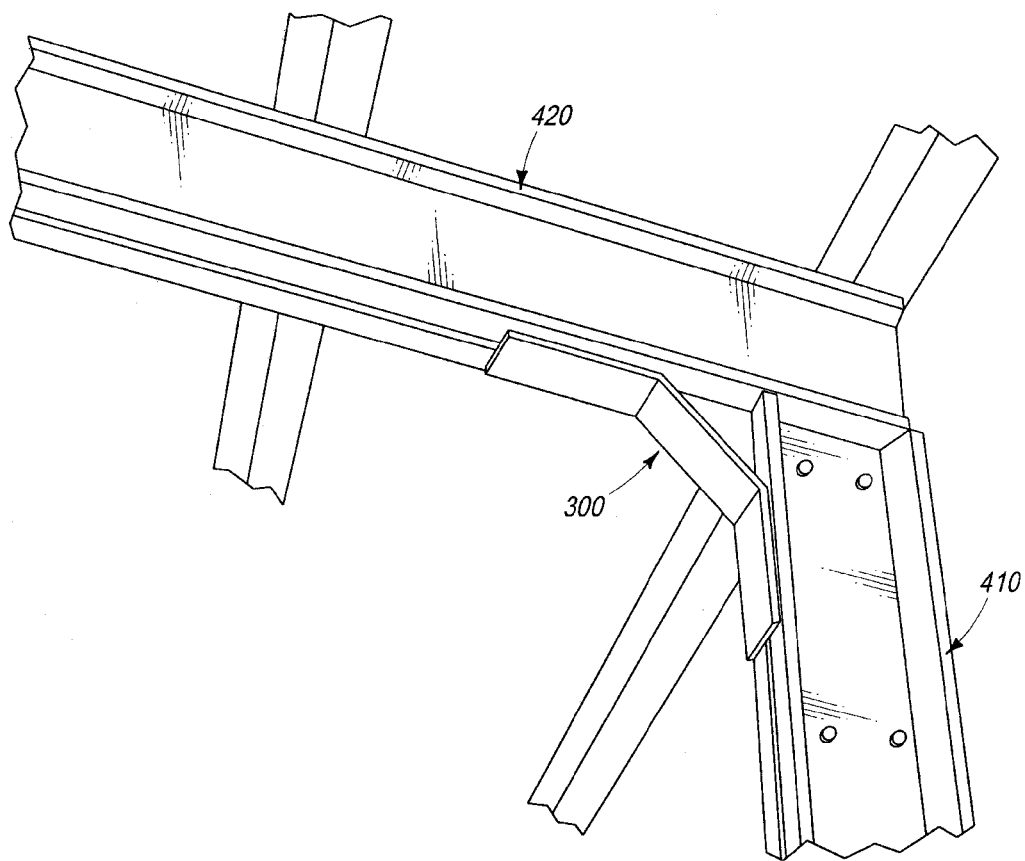

The support member 330 may be configured to support a load and to abut the first and second structural members 410, 420 to help maintain the first and second structural members 410, 420 at a predetermined angle relative to one another, as shown in FIG. 4b and FIG. 4c. To support a load, the support member may have dimensions, shape, and material properties to resist buckling in direction 405 (such as under forces provided by the first and second structural members 410, 420 and snow, water, or other elements resting thereon, for example). For example, the support member 330 may be constructed of steel ¼ inch thick, the length between the opposed sides 332 may be approximately 4 inches, and the length of each section 336 may be approximately 6½ inches. For another example, the support member 330 may be constructed of steel ¼ inch thick, the length between the opposed sides 332 may be approximately 4 inches, and the length of each section 336 may be approximately 9 inches. It should be understood that other dimensions and configurations are also contemplated and acceptable. While the support member 330 is shown in FIG. 3 to have ends 334a, 334b and to extend continuously along the inner edge 315 between ends 334a, 334b, cutouts and/or other interruptions in the inner edge 315 and/or the support member 330 may be incorporated so long as load considerations are accounted for.

Further, the support member 330 may provide support to the insert member 310 to maintain the insert member 310 in a planar configuration and resist movement of the support member 420 in directions 405a, 405b (FIG. 4b) relative to the support member 410. As a result, the thickness of the insert member 310 may be reduced relative to the prior art plate 100. For example, an insert member 310 constructed of steel having a thickness of approximately ¼ may exhibit better structural properties than a prior art plate 100 constructed of steel having a thickness of approximately ⅜ inch when the support member 330 is coupled to the insert member 310.

Figure 6A:
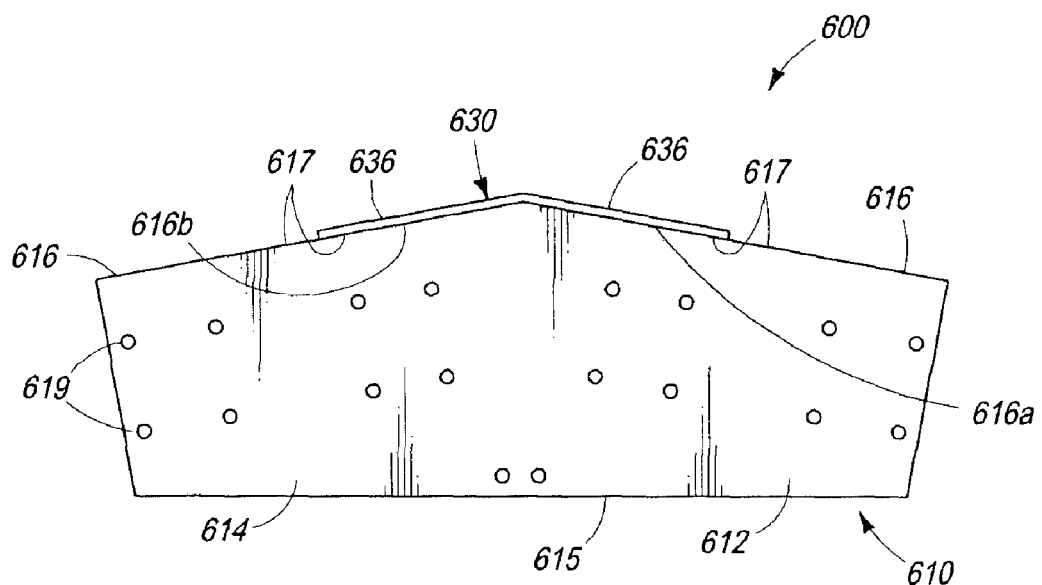
FIG. 6a is a side view of a connection plate according to an embodiment.
Figure 6B:
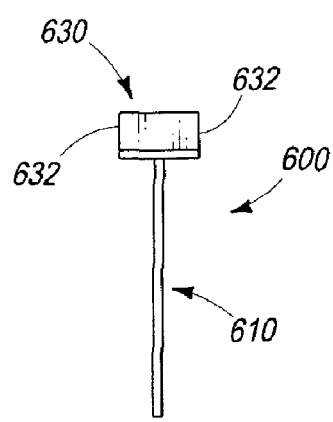
Figure 7:
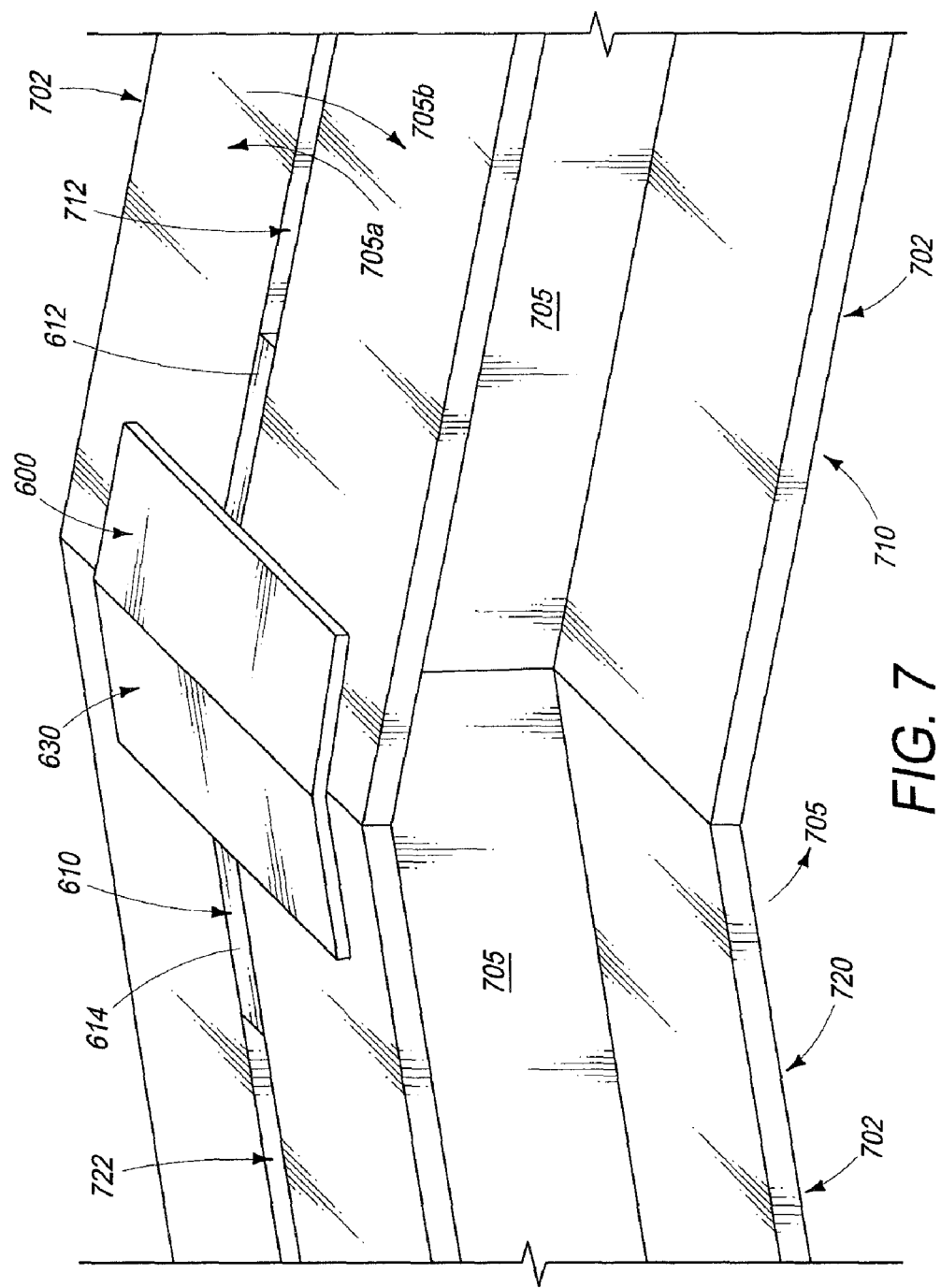
FIG. 7 shows the connection plate of FIG. 6a in use.

FIGS. 6a and 6b show another embodiment of a connection plate 600 for use in constructing a metal building (e.g., a prefabricated metal building). The connection plate 600 includes a generally planar insert member 610 and a support member 630. The insert member 610 has a first side 612 configured to be at least partially received in a slot 712 defined by a first structural member 710 and a second side 614 configured to be at least partially received in a slot 722 defined by a second structural member 720 (FIG. 7). The first and second structural members 710, 720 may each be, for example, pairs of "C" shaped members 702 positioned so that generally planar sides 705 are adjacent one another with slots 712, 722 therebetween. The first structural member 710 may be, for example, a rafter, and may or may not be parallel to a ground surface. The second structural member 720 may be, for example, a rafter member, and may or may not be parallel to a ground surface. In at least one embodiment, at least one of the first structural member 710 and the second structural member 720 is not parallel to the ground surface. The first and second sides 612, 614 collectively define an inner edge 615 and an outer edge 617. A portion of the outer edge 617 that corresponds to the first side 612 is angled relative to a portion of the outer edge 617 that corresponds to the second side 614. The insert member 610 may define a plurality of holes 619 for use in coupling the first and second structural members 710, 720 to the insert member 610 with bolts or other fasteners. The holes 619 may be particularly useful in erecting prefabricated buildings, though they may also be useful in other applications.

As shown in FIG. 6a, the outer edge 617 may include a plurality of linear sections 616. A respective linear section 616a may correspond to the first side 612 of the insert member 610, and another linear section 616b may correspond to the second side 614 of the insert member 610. As best shown in FIG. 6a, the linear section 616a corresponding to the first side 612 and the linear section 616b corresponding to the second side 614 may be separated by an angle of about ninety degrees to under one hundred and eighty degrees in one embodiment for particular use with a rafter 710 and a rafter 720. For example, the sections 616*a*, 616*b* may be separated by an angle of about one hundred and sixty-one degrees, as shown in FIG. 6*a*.

The support member 630 may be coupled to the first side 612 of the insert member 610 and the second side 614 of the insert member 610 and extend generally perpendicular to the insert member 610, as shown in FIGS. 6*a* and 6*b*. The support member 630 may be coupled to the insert member 610 by welding, adhesive, and/or any other appropriate device or method. The support member 630 may extend generally perpendicular to the insert member 610 in two directions so that the insert member 610 is positioned between opposed sides 632 of the support member 630 (FIG. 6*b*). As shown in FIG. 6*a*, the support member 630 may be adjacent the outer edge 617, and the support member 630 may extend entirely or only partially therealong. If the support member 630 extends along the outer edge 617, the support member 630 may include a plurality of linear sections 636 that correspond to the linear sections 616 of the outer edge 617.

The support member 630 may be configured to support a load and to abut the first and second structural members 710, 720 to help maintain the first and second structural members 710, 720 at a predetermined angle relative to one another, as shown in FIG. 7 (which in particular is not drawn to scale). To support a load, the support member may have dimensions, shape, and material properties to resist buckling in direction 705 (such as under forces provided by the first and second structural members 710, 720 and snow, water, or other elements resting thereon, for example). For example, the support member 630 may be constructed of steel ¼ inch thick, the length between the opposed sides 632 may be approximately 4 inches, and the length of each section 636 may be approximately 9 inches. It should be understood that other dimensions and configurations are also contemplated and acceptable. While the support member 630 is shown in FIG. 6*a* to have ends 634*a*, 634*b* and to extend continuously along the outer edge 617 between ends 634*a*, 634*b*, cutouts and/or other interruptions in the outer edge 617 and/or the support member 630 may be incorporated so long as load considerations are accounted for.

Further, the support member 630 may provide support to the insert member 610 to maintain the insert member 610 in a planar configuration and resist movement of the support member 630 in directions 705*a*, 705*b* (FIG. 7) relative to the support member 710. As a result, the thickness of the insert member 610 may be reduced relative to the prior art plate. For example, an insert member 610 constructed of steel having a thickness of approximately ¼ may exhibit better structural properties than a prior art plate constructed of steel having a thickness of approximately ⅜ inch when the support member 630 is coupled to the insert member 610.

Those skilled in the art appreciate that variations from the specified embodiments disclosed above are contemplated herein and that the described embodiments are not limiting. The description should not be restricted to the above embodiments, but should be measured by the following claims.

What is claimed:

1. A portion of a metal building, comprising:
   a first structural member having a slot;
   a second structural member having a slot; and
   a connection plate having:
      a generally planar insert member with a first side and a second side, the first and second sides collectively defining an inner edge and an outer edge; and
      a support member with linear sections angled relative to one another, the support member linear sections being coupled to the insert member first side and the insert member second side at the outer edge, the support member extending generally perpendicular to the insert member;
   wherein the support member has first and second ends and the insert member extends beyond the support member first end and the support member second end;
   wherein the insert member first side is at least partially in the first structural member slot and coupled to the first structural member;
   wherein the insert member second side is at least partially in the second structural member slot and coupled to the second structural member;
   wherein the first structural member is a column or a rafter having a pair of C shaped members; each C shaped member having a planar side extending between opposed sides, the planar side and the opposed sides collectively defining the C shape; each C shaped member having opposed ends; the planar sides being adjacent one another with the first structural member slot defined therebetween, the first structural member slot extending between the opposed ends; and
   wherein the second structural member is a rafter having a pair of C shaped members; each C shaped member having a planar side extending between opposed sides, the planar side and the opposed sides collectively defining the C shape; each C shaped member having opposed ends; the planar sides being adjacent one another with the second structural member slot defined therebetween, the second structural member slot extending between the opposed ends.

2. The portion of a metal building of claim 1, wherein the support member extends continuously along the insert member from the support member first end to the support member second end.

3. The portion of a metal building of claim 2, wherein:
   one linear section of the support member is offset from the first structural member such that the linear section sits above the pair of C shaped members in the first structural member and conceals a portion of the first structural member slot; and
   the other linear section of the support member is offset from the second structural member such that the linear section sits above the pair of C shaped members in the second structural member and conceals a portion of the second structural member slot.

4. The portion of a metal building of claim 3, wherein the insert member defines a plurality of holes passing therethrough.

5. The portion of a metal building of claim 4, wherein:
   the support member is constructed of steel having a thickness of approximately ¼ inch; and
   the insert member is constructed of steel having a thickness of approximately ¼ inch.

6. The portion of a metal building of claim 5, wherein the support member is welded to the insert member.

7. The portion of a metal building of claim 1, wherein the support member is welded to the insert member.

8. The portion of a metal building of claim 1, wherein:
   one linear section of the support member is offset from the first structural member such that the linear section sits above the pair of C shaped members in the first structural member and conceals a portion of the first structural member slot; and the other linear section of the support member is offset from the second structural member such that the linear section sits above the pair of C shaped members in the second structural member and conceals a portion of the second structural member slot.

9. A portion of a metal building, comprising:
a first structural member having a slot; the first structural member being a column or a rafter having a pair of C shaped members; each C shaped member having a planar side extending between opposed sides, the planar side and the opposed sides collectively defining the C shape; each C shaped member having opposed ends; the planar sides being adjacent one another with the first structural member slot defined therebetween, the first structural member slot extending between the opposed ends; and
a second structural member having a slot; the second structural member being a rafter having a pair of C shaped members; each C shaped member having a planar side extending between opposed sides, the planar side and the opposed sides collectively defining the C shape; each C shaped member having opposed ends; the planar sides being adjacent one another with the second structural member slot defined therebetween, the second structural member slot extending between the opposed ends; and
a connection plate having:
  a generally planar insert member with a first side and a second side; the insert member first side being at least partially in the first structural member slot and coupled to the first structural member; the insert member second side being at least partially in the second structural member slot and coupled to the second structural member; and
  a support member with linear sections angled relative to one another, the support member linear sections being coupled to the insert member first side and the insert member second side such that the support member is not in the first member slot and the support member is not in the second member slot, the support member extending generally perpendicular to the insert member;
  wherein the support member has first and second ends and the insert member extends beyond the support member first end and the support member second end.

10. The portion of a metal building of claim 9, wherein the support member extends continuously along the insert member from the support member first end to the support member second end.

11. The portion of a metal building of claim 9, wherein:
  one linear section of the support member is offset from the first structural member such that the linear section sits above the pair of C shaped members in the first structural member and conceals a portion of the first structural member slot; and
  the other linear section of the support member is offset from the second structural member such that the linear section sits above the pair of C shaped members in the second structural member and conceals a portion of the second structural member slot.

12. The portion of a metal building of claim 11, wherein the insert member defines a plurality of holes passing therethrough.

13. The portion of a metal building of claim 12, wherein:
  the support member is constructed of steel having a thickness of approximately ¼ inch; and
  the insert member is constructed of steel having a thickness of approximately ¼ inch.

14. The portion of a metal building of claim 13, wherein the support member is welded to the insert member.

15. The portion of a metal building of claim 9, wherein the support member is welded to the insert member.

16. The portion of a metal building of claim 9, wherein:
  one linear section of the support member is offset from the first structural member such that the linear section sits above the pair of C shaped members in the first structural member and conceals a portion of the first structural member slot; and
  the other linear section of the support member is offset from the second structural member such that the linear section sits above the pair of C shaped members in the second structural member and conceals a portion of the second structural member slot.

17. The portion of a metal building of claim 16, wherein the insert member defines a plurality of holes passing therethrough.

18. The portion of a metal building of claim 17, wherein the support member is welded to the insert member.

* * * * *